United States Patent
Zeiynali Farid et al.

(10) Patent No.: US 12,293,657 B2
(45) Date of Patent: May 6, 2025

(54) SYSTEMS AND METHODS FOR MITIGATING LANE-CHANGE DISTURBANCE BASED ON COOPERATIVE MANEUVERING

(71) Applicant: Toyota Motor Engineering & Manufacturing North America, Inc., Plano, TX (US)

(72) Inventors: Yashar Zeiynali Farid, Mountain View, CA (US); Sergei S. Avedisov, Mountain View, CA (US); Onur Altintas, Mountain View, CA (US); Kentaro Oguchi, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 200 days.

(21) Appl. No.: 17/830,776

(22) Filed: Jun. 2, 2022

(65) Prior Publication Data
US 2023/0394957 A1     Dec. 7, 2023

(51) Int. Cl.
*G08G 1/01* (2006.01)
*G08G 1/052* (2006.01)
*B60W 30/18* (2012.01)

(52) U.S. Cl.
CPC ........... *G08G 1/0112* (2013.01); *G08G 1/052* (2013.01); *B60W 30/18163* (2013.01)

(58) Field of Classification Search
CPC ............................. G08G 1/0112; G08G 1/052; B60W 30/18163
See application file for complete search history.

(56) References Cited

U.S. PATENT DOCUMENTS

| 10,089,876 | B1* | 10/2018 | Ramasamy | ............ G05D 1/028 |
| 2017/0200371 | A1 | 7/2017 | Glander | |
| 2019/0051159 | A1* | 2/2019 | Wang | ................... G05D 1/0027 |

FOREIGN PATENT DOCUMENTS

| CN | 109987093 A | 7/2019 |
| CN | 109035862 B | 4/2020 |

(Continued)

OTHER PUBLICATIONS

Kang Sun, et al., "A Cooperative Lane Change Model For Connected And Autonomous Vehicles On Two Lanes Highway By Considering The Traffic Efficiency On Both Lanes", Journal of Transportation Research Interdisciplinary Perspectives, Mar. 2021, vol. 9.

(Continued)

*Primary Examiner* — Brian P Sweeney
(74) *Attorney, Agent, or Firm* — Dinsmore & Shohl LLP

(57) ABSTRACT

A method for mitigating lane-change disturbance based on cooperative maneuvering includes obtaining traffic data from a target lane, determining whether a traffic in the target lane becomes string unstable in response to an ego vehicle moving to the target lane based on learned car-following models and the traffic data, identifying a connected vehicle in the target lane in response to determining that the traffic in the target lane becomes string unstable in response to an ego vehicle moving to the target lane, and requesting that the identified connected vehicle change lanes from the target lane to another lane to obtain an empty space between a vehicle in front of the identified connected vehicle and a vehicle behind the identified connected vehicle or follow a suggested speed profile to obtain an empty space between the identified connected vehicle and a vehicle in front of the identified connected vehicle.

12 Claims, 17 Drawing Sheets

(56) References Cited

FOREIGN PATENT DOCUMENTS

| CN | 111081065 A | 4/2020 |
|---|---|---|
| CN | 109501799 B | 8/2020 |
| CN | 108919799 B | 11/2020 |
| CN | 113110486 A | 7/2021 |

OTHER PUBLICATIONS

Runjia Du, et al., "A Cooperative Control Framework for CAV Lane Change in a Mixed Traffic Environment", Book, Oct. 11, 2020.
George Gunter, et al., "Model-Based String Stability of Adaptive Cruise Control Systems Using Field Data", Journal of IEEE Transactions on Intelligent Vehicles, Mar. 2020, vol. 5, No. 1, pp. 90-99.
Jie Ni, et al., "Multivehicle Cooperative Lane Change Control Strategy for Intelligent Connected Vehicle", Journal of Advanced Transportation, Feb. 28, 2020.
Raphael E. Stern, et al., "Dissipation Of Stop-And-Go Waves Via Control Of Autonomous Vehicles: Field Experiments", Journal of Transportation Research Part C: Emerging Technologies, May 4, 2017, vol. 89, pp. 205-221.
Kiaopeng Li, et al., "Stop-And-Go Traffic Analysis: Theoretical Properties, Environmental Impacts And Oscillation Mitigation", Journal of Transportation Research Part B: Methodological, Dec. 1, 2014, vol. 70, pp. 319-339.
Zuduo Zheng, et al., "Freeway Traffic Oscillations: Microscopic Analysis of Formations and Propagations using Wavelet Transform", Journal of Procedia Social and Behavioral Sciences, Nov. 1, 2011, vol. 17, pp. 717-731.

\* cited by examiner

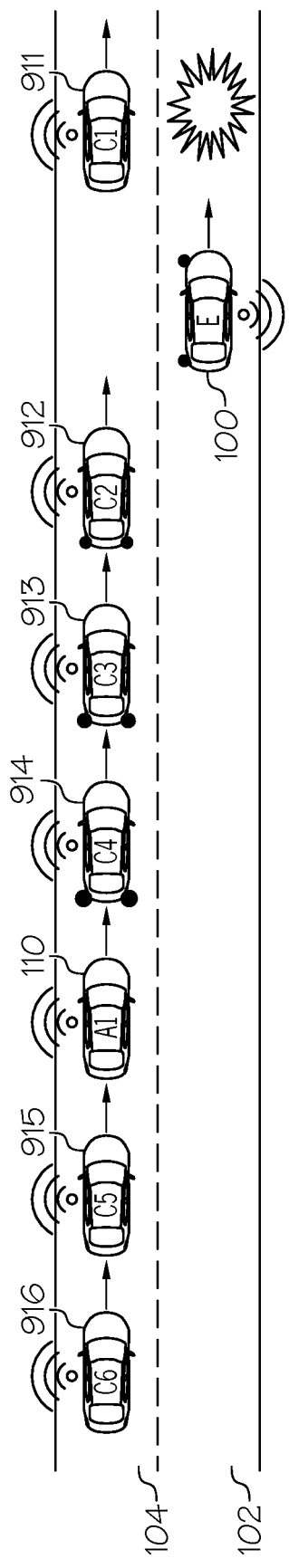
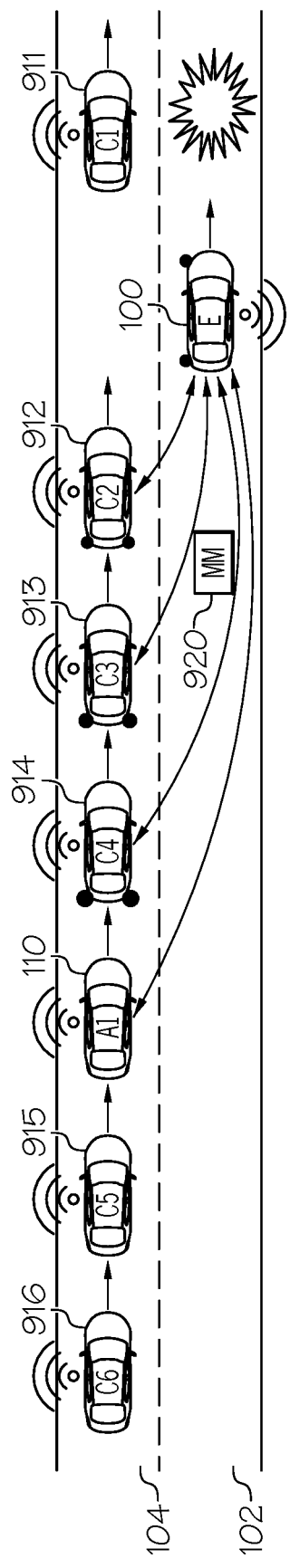
FIG. 9A
FIG. 9B

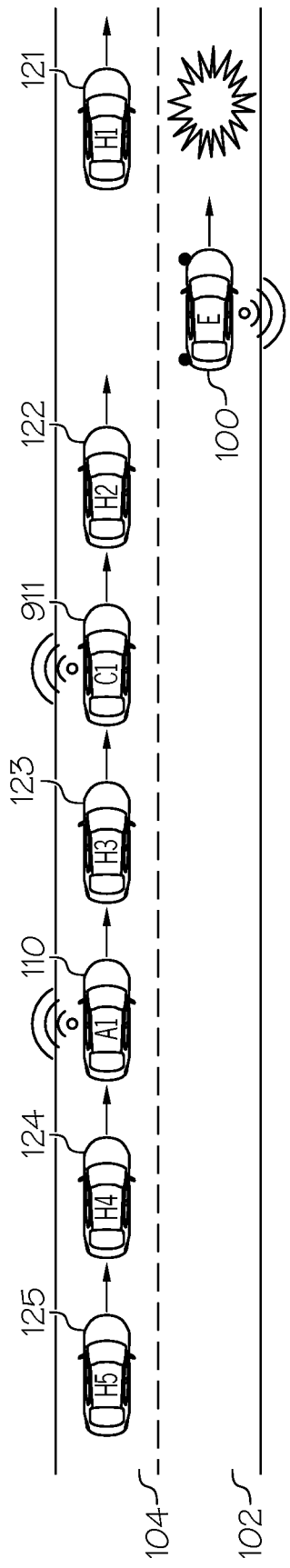
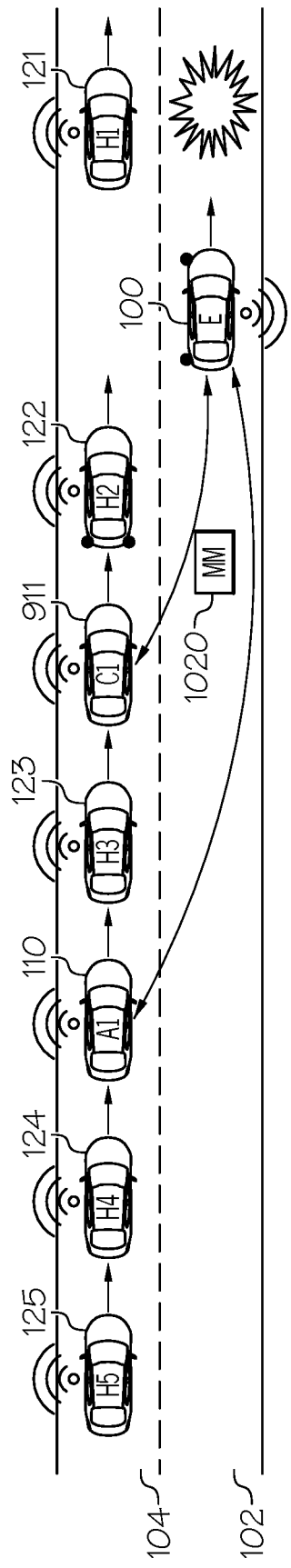

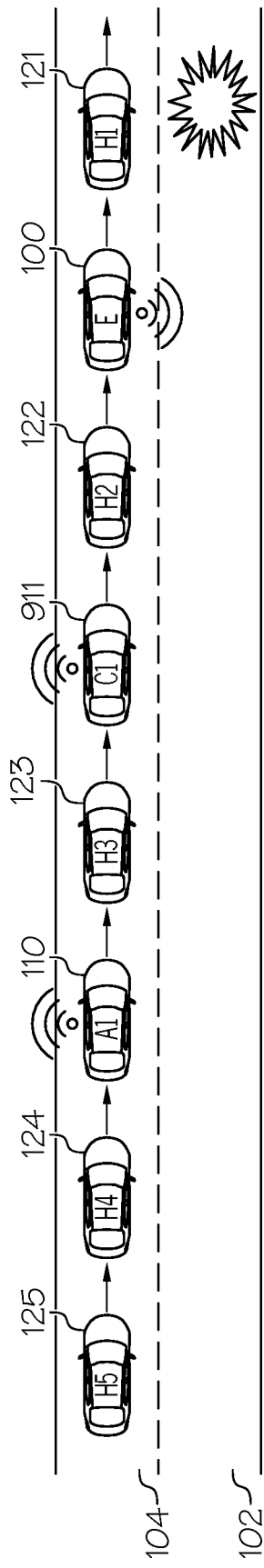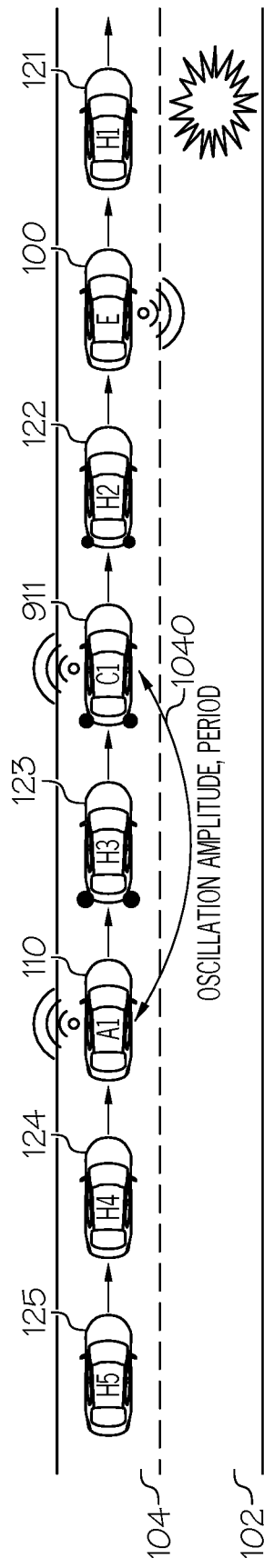
FIG. 10C
FIG. 10D

SYSTEMS AND METHODS FOR MITIGATING LANE-CHANGE DISTURBANCE BASED ON COOPERATIVE MANEUVERING

TECHNICAL FIELD

The present disclosure relates to systems and methods for mitigating lane-change disturbance based on cooperative maneuvering.

BACKGROUND

Drivers perform mandatory and/or discretionary lane-changes to follow their route or improve their trip experience. Mandatory lane change decisions are made based on routes, turning points, downstream blockages, while discretionary lane-change decisions are made based on general incentives such as increasing speed. Lane-change actions of vehicles can affect the efficiency of a traffic system. It has been shown that disturbances by lane-change actions in certain traffic densities can lead to traffic instabilities.

Traffic instabilities can result in stop-and-go waves which can reduce the capacity of the road and produce traffic congestion. Planning connected vehicles' (CVs) actions considering the potential impact on traffic stability can improve the performance of the CVs and the whole traffic.

Accordingly, a need exists for systems and methods that mitigate congestions caused by the lane-change maneuvers in mixed traffic (including various types of vehicles such as non-connected human-driven, connected non-cooperating vehicles, and connected cooperating vehicles) conditions.

SUMMARY

The present disclosure provides systems and methods for managing cooperative maneuvering among connected vehicles.

In one embodiment, a method for mitigating lane-change disturbance based on cooperative maneuvering is provided. The method includes obtaining traffic data from a target lane, determining whether a traffic in the target lane becomes string unstable in response to an ego vehicle moving to the target lane based on learned car-following models and the traffic data, identifying a connected vehicle in the target lane in response to determining that the traffic in the target lane becomes string unstable in response to an ego vehicle moving to the target lane, and requesting that the identified connected vehicle change lanes from the target lane to another lane to obtain an empty space in front of the identified connected vehicle and a vehicle behind the identified connected vehicle.

In another embodiment, a method for controlling longitudinal movements of vehicles is provided. The method includes obtaining traffic data from a target lane, determining whether a traffic in the target lane becomes string unstable in response to an ego vehicle moving to the target lane based on learned car-following models and the traffic data, identifying a connected vehicle in the target lane in response to determining that the traffic in the target lane becomes string unstable in response to an ego vehicle moving to the target lane, generating a suggested speed profile for the identified connected vehicle based on the traffic data and the learned car-following models, and requesting that the identified connected vehicle drive based on the suggested speed profile.

In another embodiment, a system for mitigating traffic congestion is provided. The system includes a processor programmed to perform operations including obtaining traffic data from a target lane, determining whether a traffic in the target lane becomes string unstable in response to an ego vehicle moving to the target lane based on learned car-following models and the traffic data, identifying a connected vehicle in the target lane in response to determining that the traffic in the target lane becomes string unstable in response to an ego vehicle moving to the target lane, and requesting that the identified connected vehicle change lanes from the target lane to another lane to obtain an empty space between a vehicle in front of the identified connected vehicle and a vehicle behind the identified connected vehicle.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIGS. 9A, 9B, 9C, and 9D depict an example of performing longitudinal control in a fully connected scenario, according to one or more embodiments shown and described herein;

FIGS. 10A, 10B, 10C, 10D, and 10E depict an example of performing longitudinal control in a partially connected scenario, according to one or more embodiments shown and described herein.

DETAILED DESCRIPTION

The embodiments disclosed herein include systems and methods for managing cooperative maneuvering among connected vehicles.

Figure 4A:
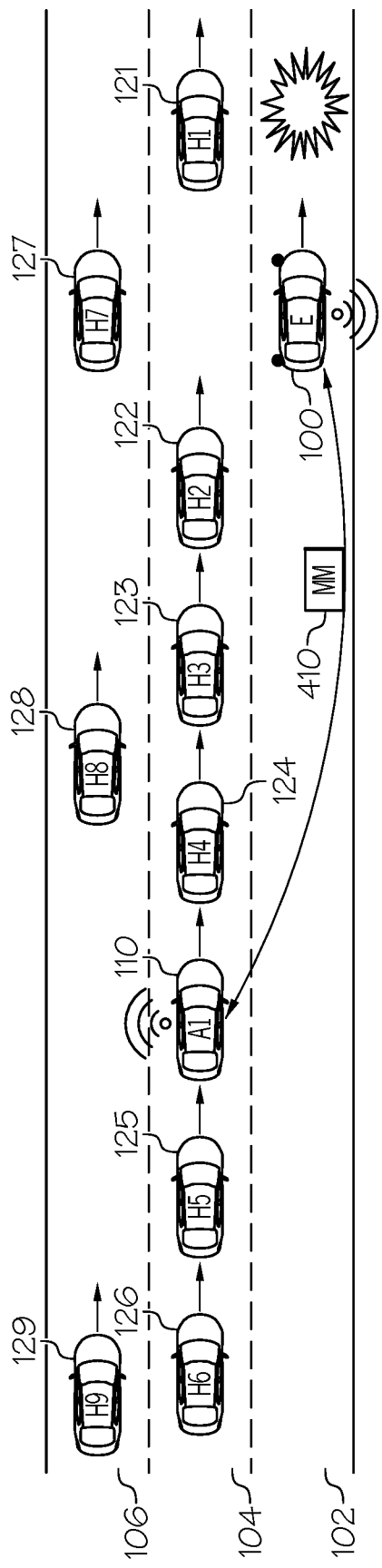
FIGS. 4A, 4B, and 4C depict a density reduction strategy example where an ego vehicle cooperates with a connected vehicle, according to one or more embodiments shown and described herein.
Figure 4B:
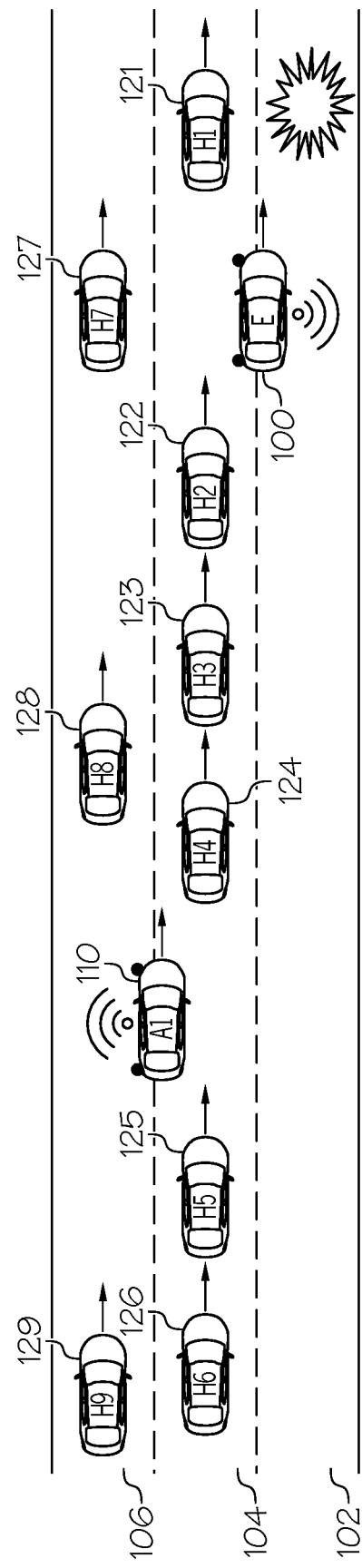
Figure 4C:
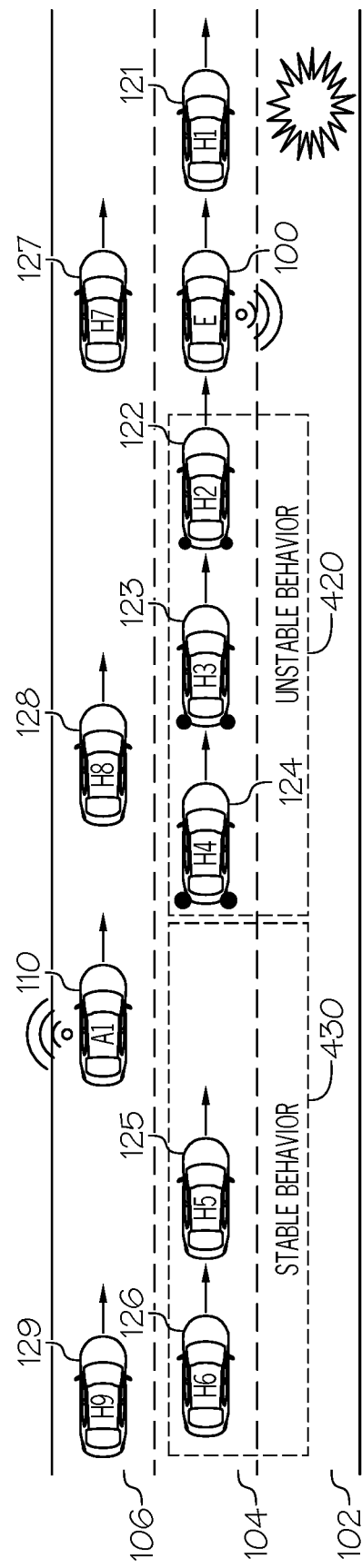

In embodiments, the present system mitigates lane-change disturbance based on cooperative maneuvering is provided. The system may predict that a traffic in the target lane 104 becomes string unstable in response to an ego vehicle 100 moving to the target lane 104 based on learned car-following models and the traffic data as illustrated in FIG. 1B. As a density reduction strategy, the system identifies a connected vehicle 110 in the target lane 104 and requests that the identified connected vehicle 110 change lanes from the target lane 104 to another lane 106 as illustrated in FIGS. 4A-4C. As a longitudinal control strategy, the system may also identify a connected vehicle 110 and request that the identified connected vehicle 110 to slow down in the target lane 104 such that the identified connected vehicle 110 and the vehicles behind the identified connected vehicle 110 experience relatively stable driving as illustrated in FIGS. 7A-7D.

Figure 1A:
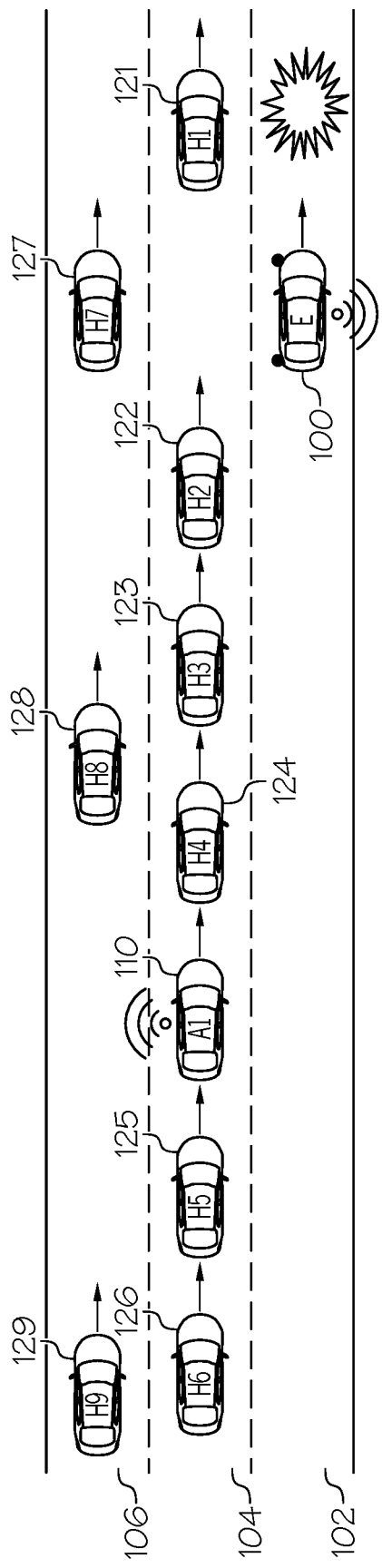
FIGS. 1A and 1B schematically depict an example scenario where unstable behavior of vehicles or string instability in a target lane is predicted in response to an ego vehicle changing lanes, in accordance with one or more embodiments shown and described herewith.
Figure 1B:
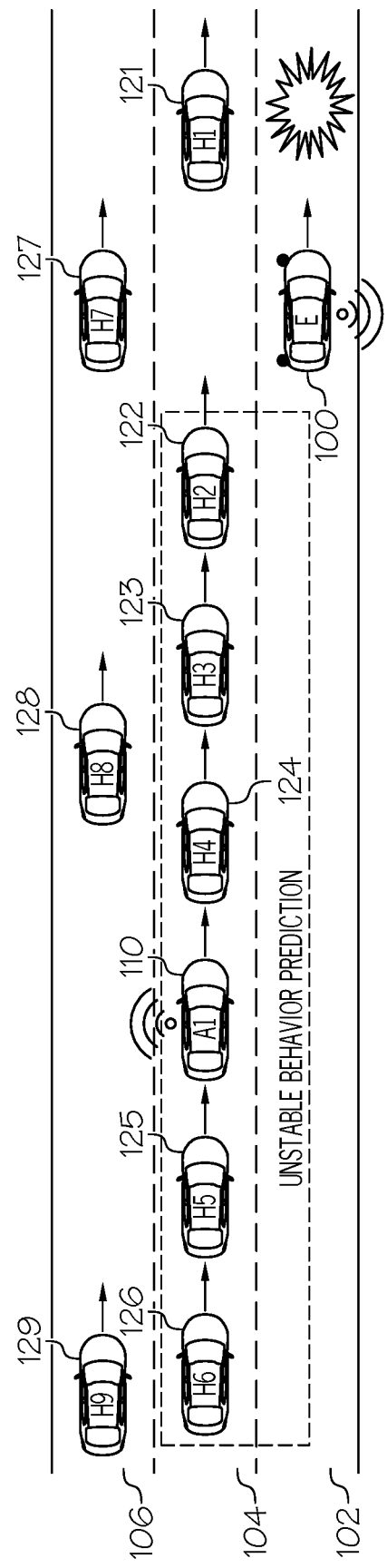

FIGS. 1A and 1B schematically depict an example scenario where unstable behavior of vehicles or string instability in a target lane is predicted in response to an ego vehicle changing lanes, in accordance with one or more embodiments shown and described herewith.

In FIG. 1A, an ego vehicle 100 identifies an obstacle in a lane 102, and plans to change lanes from the lane 102 to a target lane 104. In the target lane 104, a connected vehicle 110 and unconnected vehicles 121, 122, 123, 124, 125, and 126 are driving. Each of the ego vehicle 100, the connected vehicle 110, and the unconnected vehicles 121, 122, 123, 124, 125, and 126 may be a vehicle including an automobile or any other passenger or non-passenger vehicle such as, for example, a terrestrial, aquatic, and/or airborne vehicle. Unconnected vehicles 127, 128, 129 are driving in a third land 106. In some embodiments, each of the ego vehicle 100 and the connected vehicle 110 may be an autonomous driving vehicle.

The ego vehicle 100 may detect the presence of the connected vehicle 110 and the unconnected vehicles 121, 122, 123, 124, 125, and 126 using sensors such as radar sensor, LIDAR sensors, cameras, or by communicating with the connected vehicle 110 via a vehicle-to-vehicle connection ("V2V connection"). The ego vehicle 100 may collect traffic information in the target lane 104. The traffic information may include the presence and speed of connected or unconnected vehicles in the target lane 104, the traffic density of vehicles in the target lane 104, and the like. The presence, speeds, and/or accelerations of connected or unconnected vehicles in the target lane 104 may be obtained by the sensors of the ego vehicle 100. The traffic density may be estimated by a world model. The world model receives sensor data, wireless messages, and GPS data as input, and outputs traffic density estimation for the target lane 104.

FIG. 1B depicts an example of the lane changing maneuver by the ego vehicle 100. The system of the ego vehicle 100 may simulate the vehicles in the target lane 104 based on learned car-following models and collected traffic information. The car-following models may include, but not limited to, an optimal velocity model (OVM), intelligent driver model (IDM), and a Gipps car following model. As another example, a trained artificial intelligence model may consider the traffic density, dynamics of surrounding vehicles into account. In addition, this model may consider the trajectories that the ego vehicle, cooperative vehicles and other vehicles will take. Having an AI trained model or a lookup table trained on previous data in advance would allow for quick determination of which vehicle can cooperate with which vehicle, which may be critical in a dynamic task.

In this example, the ego vehicle 100 may turn on left turn signals and initiate lane changing maneuver. In response to the left turn signals and/or the lane changing maneuver, the unconnected vehicle 122 may slightly break to provide a space for the ego vehicle 100 in the target lane 104. Then, the vehicles behind the unconnected vehicle 122 may further brake in response to the brake of the unconnected vehicle 122 as illustrated in FIG. 1B. Specifically, the unconnected vehicle 123 may break further than the unconnected vehicle 122, the unconnected vehicle 124 may break further than the unconnected vehicle 123, the connected vehicle 110 may break further than the unconnected vehicle 124, the unconnected vehicle 125 may break further than the connected vehicle 110, and the unconnected vehicle 126 may break further than the unconnected vehicle 125. This cascading of braking may lead to a stop-and-go jam and is referred to as string instability (a type of traffic instability).

The present system mitigates traffic instabilities by two approaches. One is a density reduction strategy and the other is a longitudinal control strategy, i.e., controlling acceleration of connected vehicles in the target lane. The density reduction strategy will be described with reference to FIGS. 3-5, and the longitudinal control strategy will be described with reference to FIGS. 6-11.

Figure 2:
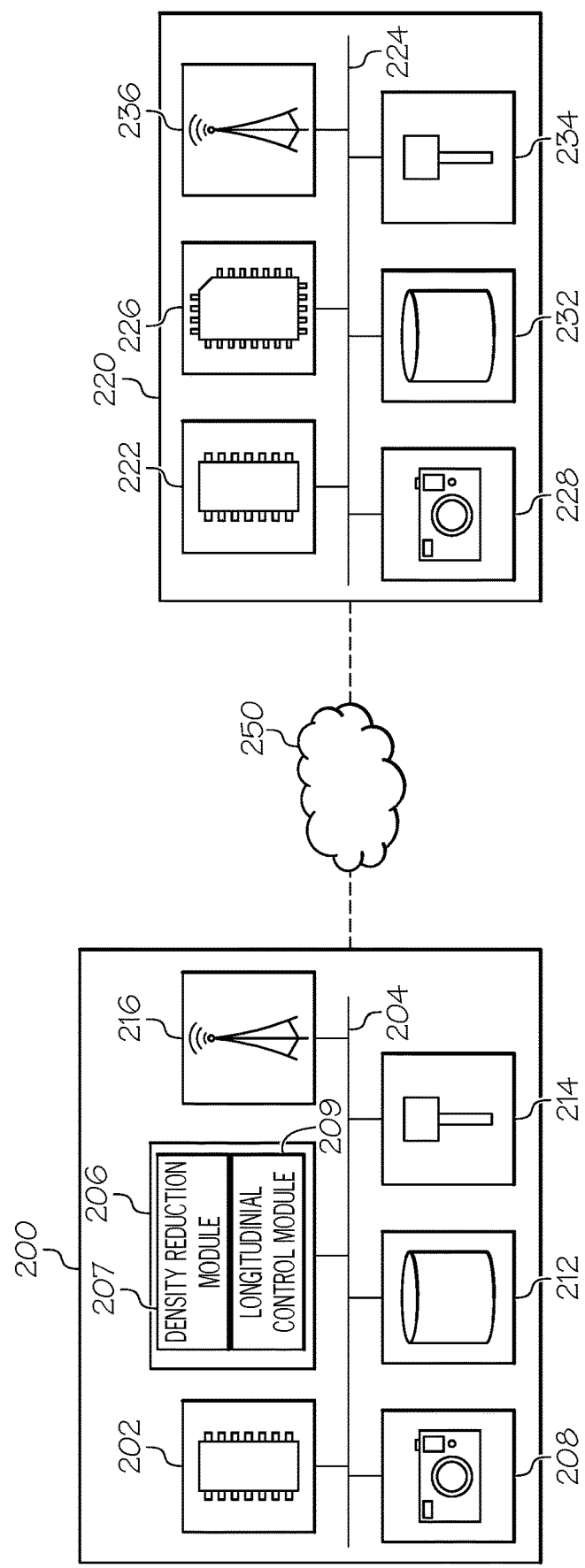
FIG. 2 depicts a schematic diagram of a traffic instabilities mitigation system, according to one or more embodiments shown and described herein.

FIG. 2 depicts a schematic diagram of a traffic instabilities mitigation system, according to one or more embodiments shown and described herein. The system includes an ego vehicle system 200, and a connected vehicle system 220.

It is noted that, while the ego vehicle system 200, and the connected vehicle system 220 are depicted in isolation, each of the ego vehicle system 200, and the connected vehicle system 220 may be included within a vehicle in some embodiments, for example, respectively within each of the ego vehicle 100, and the connected vehicle 110 of FIG. 1. While FIG. 2 depicts that the ego vehicle system 200 communicates with one connected vehicle system 220, the ego vehicle system 200 may communicate with more than one connected vehicle system. In embodiments, each of the ego vehicle system 200 and the connected vehicle system 220 may be included within a vehicle that may be an automobile or any other passenger or non-passenger vehicle such as, for example, a terrestrial, aquatic, and/or airborne vehicle. In some embodiments, the vehicle may be an autonomous vehicle that navigates its environment with limited human input or without human input.

The ego vehicle system 200 includes one or more processors 202. Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC), and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The ego vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The one or more processors 202 along with the one or more memory modules 206 may operate as a controller for the ego vehicle system 200.

The one or more memory modules 206 includes a density reduction module 207 and a longitudinal control module 209. The density reduction module 207 and the longitudinal control module 209 work together or independently to mitigate expected traffic instabilities in a target lane, e.g., the target lane 104 in FIGS. 1A and 1B. Each of the density reduction module 207 and the longitudinal control module 209 may be a program module in the form of operating systems, application program modules, and other program modules stored in one or more memory modules 206. In some embodiments, the program module may be stored in a remote storage device that may communicate with the ego vehicle system 200, for example, in a cloud server or an edge server. Such a program module may include, but is not limited to, routines, subroutines, programs, objects, components, data structures, and the like for performing specific tasks or executing specific data types as will be described below.

In embodiments, the density reduction module 207 identifies a potential cooperating vehicle in a target lane based on traffic information in the target lane, and transmits a cooperation request to the identified cooperating vehicle. Once the density reduction module 207 receives an approval from the identified cooperating vehicle, the density reduction module 207 transmits an instruction to reduce density in the target lane, i.e., changing lanes from a current lane to another lane, to the identified cooperative vehicle. Then, the ego vehicle may change lanes from a current lane to the target lane. For example, by referring to FIG. 1A, the ego vehicle 100 may transmits an instruction to the connected vehicle 110 to change lanes from the target lane 104 to the third lane 106.

In embodiments, the longitudinal control module 209 identifies a potential cooperating vehicle in a target lane based on traffic information in the target lane, and determines whether a traffic in the target lane becomes string unstable in response to an ego vehicle moving to the target lane based on the traffic information and learned car following models. Then, the longitudinal control module 209 generates a speed profile for the identified cooperating vehicle based on the estimated potential oscillations. The longitudinal control module 209 transmits a cooperation request including the speed profile to the identified cooperating vehicle. Once the longitudinal control module 209 receives an approval from the identified cooperating vehicle, the longitudinal control module 209 transmits an instruction to follow the speed profile to the identified connected vehicle. Then, the ego vehicle may change lanes from a current lane to the target lane. For example, by referring to FIG. 1A, the ego vehicle 100 may transmit an instruction to the connected vehicle 110 to slow down based on the speed profile received from the ego vehicle 100.

Referring still to FIG. 2, the ego vehicle system 200 comprises one or more sensors 208. The one or more sensors 208 may be any device having an array of sensing devices capable of detecting radiation in an ultraviolet wavelength band, a visible light wavelength band, or an infrared wavelength band. The one or more sensors 208 may detect the presence of other vehicles such as the connected vehicle 110 and the unconnected vehicles 121, 122, 123, 124, 125, and 126 in FIG. 1, and/or the distance between the ego vehicle 100 and the connected vehicle 110 and the unconnected vehicles 121, 122, 123, 124, 125, and 126. The one or more sensors 208 may have any resolution. In some embodiments, one or more optical components, such as a mirror, fish-eye lens, or any other type of lens may be optically coupled to the one or more sensors 208. In embodiments described herein, the one or more sensors 208 may provide image data to the one or more processors 202 or another component communicatively coupled to the communication path 204. In some embodiments, the one or more sensors 208 may also provide navigation support. That is, data captured by the one or more sensors 208 may be used to autonomously or semi-autonomously navigate the ego vehicle 100.

In some embodiments, the one or more sensors 208 include one or more imaging sensors configured to operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the systems described herein could include one or more LIDAR sensors, radar sensors, sonar sensors, or other types of sensors for gathering data that could be integrated into or supplement the data collection described herein. Ranging sensors like radar sensors may be used to obtain a rough depth and speed information for the view of the ego vehicle system 200.

The ego vehicle system 200 comprises a satellite antenna 214 coupled to the communication path 204 such that the communication path 204 communicatively couples the satellite antenna 214 to other modules of the ego vehicle system 200. The satellite antenna 214 is configured to receive signals from global positioning system satellites. Specifically, in one embodiment, the satellite antenna 214 includes one or more conductive elements that interact with electromagnetic signals transmitted by global positioning system satellites. The received signal is transformed into a data signal indicative of the location (e.g., latitude and longitude) of the satellite antenna 214 or an object positioned near the satellite antenna 214, by the one or more processors 202.

The ego vehicle system 200 comprises one or more vehicle sensors 212. Each of the one or more vehicle sensors 212 is coupled to the communication path 204 and communicatively coupled to the one or more processors 202. The one or more vehicle sensors 212 may include one or more motion sensors for detecting and measuring motion and changes in motion of the ego vehicle 100. The motion sensors may include inertial measurement units. Each of the one or more motion sensors may include one or more accelerometers and one or more gyroscopes. Each of the one or more motion sensors transforms sensed physical movement of the vehicle into a signal indicative of an orientation, a rotation, a velocity, or an acceleration of the vehicle.

Still referring to FIG. 2, the ego vehicle system 200 comprises network interface hardware 216 for communicatively coupling the ego vehicle system 200 to the connected vehicle system 220. The network interface hardware 216 can be communicatively coupled to the communication path 204 and can be any device capable of transmitting and/or receiving data via a network. Accordingly, the network interface hardware 216 can include a communication transceiver for sending and/or receiving any wired or wireless communication. For example, the network interface hardware 216 may include an antenna, a modem, LAN port, WiFi card, WiMAX card, mobile communications hardware, near-field communication hardware, satellite communication hardware and/or any wired or wireless hardware for communicating with other networks and/or devices. In one embodiment, the network interface hardware 216 includes hardware configured to operate in accordance with the Bluetooth® wireless communication protocol. The network interface hardware 216 of the ego vehicle system 200 may transmit its data to the connected vehicle system 220. For example, the network interface hardware 216 of the ego vehicle system 200 may transmit vehicle data, location data, maneuver data and the like to other connected vehicles, a cloud server, edge servers, and the like.

The ego vehicle system 200 may connect with one or more external vehicle systems (e.g., the connected vehicle system 220) and/or external processing devices (e.g., a cloud server, or an edge server) via a direct connection. The direct connection may be a vehicle-to-vehicle connection ("V2V connection"), a vehicle-to-everything connection ("V2X connection"), or a mmWave connection. The V2V or V2X connection or mmWave connection may be established using any suitable wireless communication protocols discussed above. A connection between vehicles may utilize sessions that are time-based and/or location-based. In embodiments, a connection between vehicles or between a vehicle and an infrastructure element may utilize one or more networks to connect, which may be in lieu of, or in addition to, a direct connection (such as V2V, V2X, mmWave) between the vehicles or between a vehicle and an infrastructure. The ego vehicle system 200 may communicate with external communicate vehicle systems using wireless messages such as basic safety messages (BSMs), maneuver massages (MMs), and the like. BSM is a wireless message transmitted between vehicles where the transmitter sends its position, speed and other static/dynamic information. MM is a general class of wireless messages exchanged between road users and infrastructure that contains the future trajectory (or possible future trajectories) of the transmitting road user. Specific examples of such messages could be the Maneuver Coordination Message (MCM) or the Maneuver Sharing Coordination Message (MSCM).

By way of non-limiting example, vehicles may function as infrastructure nodes to form a mesh network and connect dynamically on an ad-hoc basis. In this way, vehicles may enter and/or leave the network at will, such that the mesh network may self-organize and self-modify over time. Other non-limiting network examples include vehicles forming peer-to-peer networks with other vehicles or utilizing centralized networks that rely upon certain vehicles and/or infrastructure elements. Still other examples include networks using centralized servers and other central computing devices to store and/or relay information between vehicles.

Still referring to FIG. 2, the ego vehicle system 200 may be communicatively coupled to the connected vehicles system 220 or a cloud server by the network 250. In one embodiment, the network 250 may include one or more computer networks (e.g., a personal area network, a local area network, or a wide area network), cellular networks, satellite networks and/or a global positioning system and combinations thereof. Accordingly, the ego vehicle system 200 can be communicatively coupled to the network 250 via a wide area network, via a local area network, via a personal area network, via a cellular network, via a satellite network, etc. Suitable local area networks may include wired Ethernet and/or wireless technologies such as, for example, Wi-Fi. Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Still referring to FIG. 2, the connected vehicle system 220 includes one or more processors 222, one or more memory modules 226, one or more sensors 228, one or more vehicle sensors 233, a satellite antenna 235, and a communication path 224 communicatively connected to the other components of the connected vehicle system 220. The components of the connected vehicle system 220 may be structurally similar to and have similar functions as the corresponding components of the ego vehicle system 200 (e.g., the one or more processors 222 corresponds to the one or more processors 202, the one or more memory modules 226 corresponds to the one or more memory modules 206, the one or more sensors 228 corresponds to the one or more sensors 208, the one or more vehicle sensors 233 corresponds to the one or more vehicle sensors 212, the satellite antenna 235 corresponds to the satellite antenna 214, the communication path 224 corresponds to the communication path 204, and the network interface hardware 236 corresponds to the network interface hardware 216). The one or more memory modules 226 may store a density reduction module and a longitudinal control module similar to the density reduction module 207 and the longitudinal control module 209 of the ego vehicle system 200.

Figure 3:
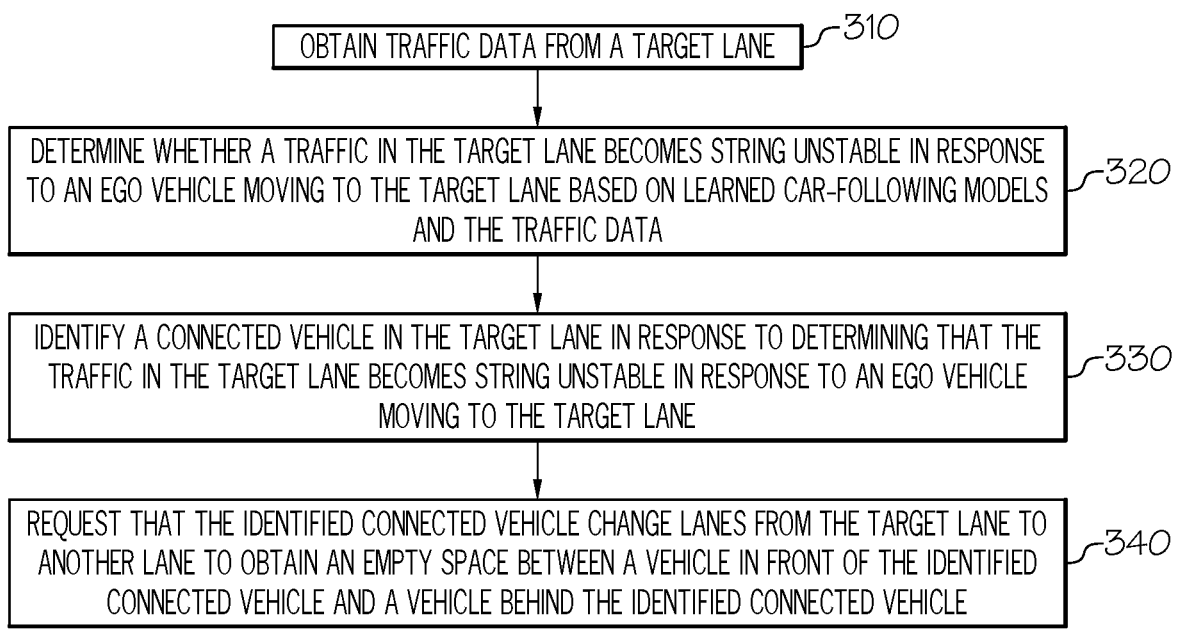
FIG. 3 depicts a flowchart for performing a density reduction strategy in a target lane, according to one or more embodiments shown and described herein.

FIG. 3 depicts a flowchart for performing a density reduction strategy in a target lane, according to one or more embodiments shown and described herein. The flowchart is described with reference to FIGS. 2 and 4A-4C of the present application.

In step 310, a controller of the ego vehicle obtains traffic data from a target lane. For example, by referring to FIG. 4A, the ego vehicle 100 may obtain traffic data from the target lane 104. The traffic data may include the presence and speed of connected or unconnected vehicles in the target lane 104, the traffic density of vehicles in the target lane 104, and the like. The presence and speed of connected or unconnected vehicles in the target lane 104 may be obtained by the sensors of the ego vehicle 100. The traffic density may be estimated by a world model. The world model receives sensor data, wireless messages, and GPS data as input, and outputs traffic density estimation for the target lane 104. The ego vehicle 100 may also learn a car-following model of vehicles in the target lane 104.

In step 320, the controller of the ego vehicle determines whether a traffic in the target lane becomes string unstable in response to an ego vehicle moving to the target lane based on learned car-following models and the traffic data. For example, the controller of the ego vehicle 100 may simulate the ego vehicle changing lanes from the lane 102 to the target lane 104 in FIG. 1B using the traffic data and the learned car following model obtained in step 310. In some embodiments, the ego vehicle 100 may determine key performance indicators, e.g., traffic flow, driver comfort, and timeliness of the maneuver, caused by the lane changing maneuver of the ego vehicle 100 by running simulations of the ego vehicle 100 and vehicles in the target lane 104. The simulation may use IDM (intelligent driving model) for upstream vehicles. Based on the key performance indicators, the controller of the ego vehicle 100 may determine whether the maneuver of the ego vehicle 100 triggers congestion or string instability in the target lane 104.

In step 330, the controller of the ego vehicle identifies a connected vehicle in the target lane in response to determining that the traffic in the target lane becomes string unstable in response to an ego vehicle moving to the target lane. For example, by referring to FIG. 1B, the ego vehicle 100 simulates its changing lanes from the lane 102 to the target lane 104 and the simulation results in string instability in the target lane 104, e.g., traffic congestion or stop-and-go traffic jam. Then, the ego vehicle 100 identifies the connected vehicle 110 in the target lane 104 as illustrated in FIG. 4A.

In step 340, the controller of the ego vehicle requests that the identified connected vehicle change lanes from the target lane to another lane to obtain an empty space between a vehicle in front of the identified connected vehicle and a vehicle behind the identified connected vehicle. For example, by referring to FIG. 4A, the controller of the ego vehicle 100 transmits a maneuver message 410 to the connected vehicle 110 to change lanes from the target lane to another lane 106. In response to receiving the maneuver message 410, the connected vehicle 110 changes lanes from the target lane 104 to the lane 106 such that an empty space between a vehicle 124 in front of the identified connected vehicle 110 and a vehicle 125 behind the identified connected vehicle 110. Then, the ego vehicle 100 changes lanes from the lane 102 to the target lane 104 as illustrated in FIG. 4B. In some embodiments, the ego vehicle 100 changes lanes from the lane 102 to the target lane 104 at the same time or before the connected vehicle 110 changes lanes from the target lane 104 to another lane 106.

In response to the ego vehicle 100 moving into the target lane 104, a group of vehicles 122, 123, 124 may show unstable behavior 420 because the vehicles 122, 123, 124 show cascading of braking as illustrated in FIG. 4C. However, because an additional space is now generated between the vehicle 124 and the vehicle 125, the vehicles 125 and 126 may not need to brake significantly, and show stable behavior or string stability 430, as illustrated in FIG. 4C.

Figure 5:
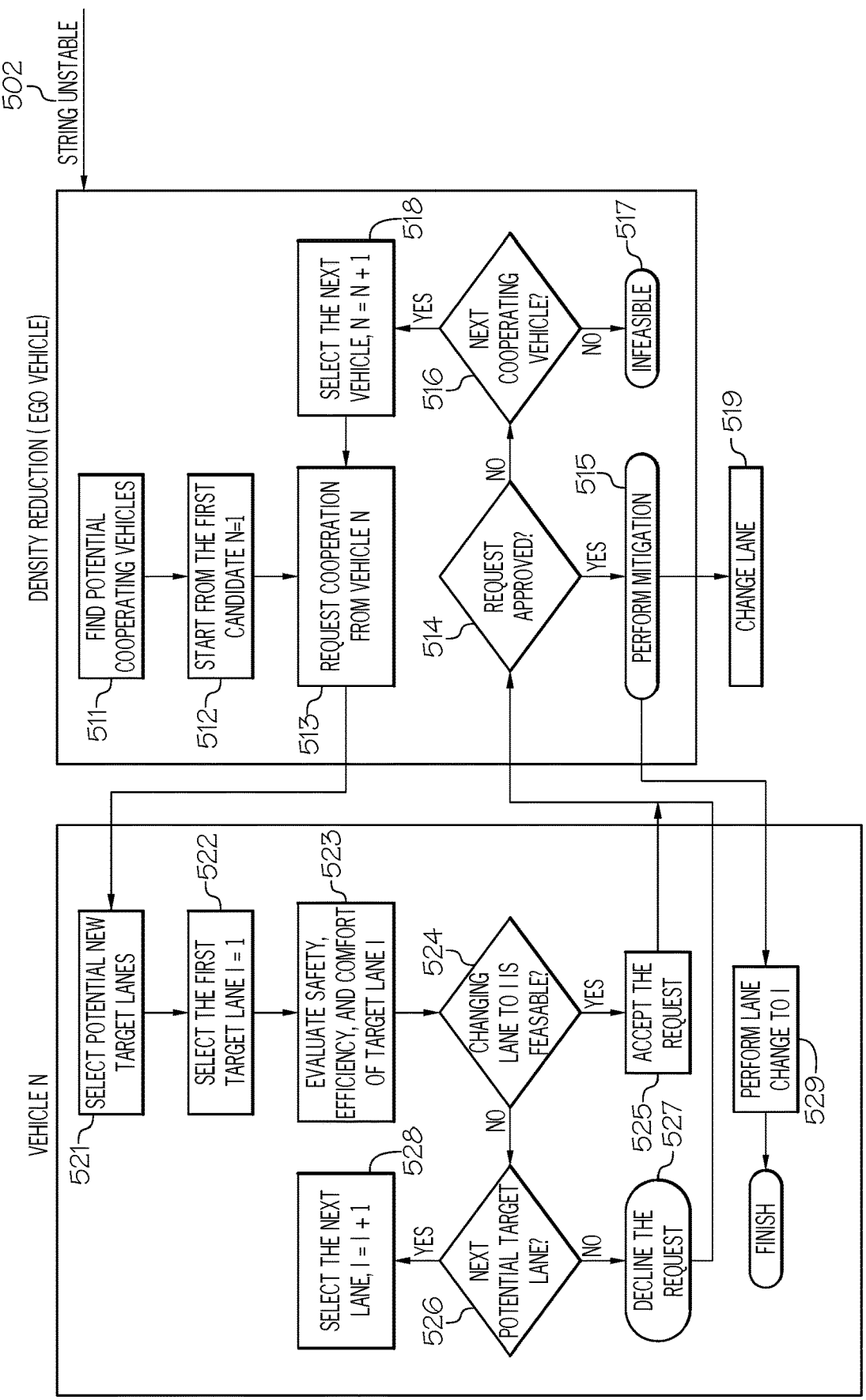
FIG. 5 depicts an overall flowchart of performing density reduction, according to one or more embodiments shown and described herein.

FIG. 5 depicts an overall flowchart of performing density reduction, according to one or more embodiments shown and described herein. The ego vehicle and vehicle n in FIG. 5 may correspond to the ego vehicle 100 and the connected vehicle 110 in FIGS. 4A-4C, respectively.

In step 502, the ego vehicle 100 determines that the traffic in the target lane 104 may be string unstable if the ego vehicle 100 changes lanes from the lane 102 to the target lane 104. In step 511, the ego vehicle 100 initiates finding a potential cooperating vehicle. In step 512, the ego vehicle 100 starts from a first candidate, e.g., the connected vehicle 110. Then, the ego vehicle 100 transmits a request for cooperation to the connected vehicle 110 in step 513. The connected vehicle 110 receives the request and identifies potential new target lanes in step 521. For example, by referring to FIG. 6A, the connected vehicle 110 may identify two potential new target lanes, lanes 102 and 106. In step 522, the connected vehicle 110 selects the lane 102. In step 523, the connected vehicle 523 evaluates safety, efficiency, and comfort of the lane 102.

In step 524, the connected vehicle determines whether changing lanes from the current lane 104 to the lane 102 is feasible. In this case, the connected vehicle 110 may determine that changing lanes from the current lane 104 to the lane 102 is not feasible because there is an obstacle in the lane 102. Then, the connected vehicle 110 determines whether there is another potential target lane. If there is no other potential target lane, the connected vehicle 110 declines the request in step 527, and transmits the decline to the ego vehicle 100. If there is another potential target lane, the connected vehicle 110 selects another target lane, for example, the lane 106, in step 528. Then, the connected vehicle 110 evaluates safety, efficiency, and comfort of the lane 106 in step 523, and determines that changing lanes from the current lane 104 to the lane 106 is feasible in step 524. Then, the connected vehicle 110 accepts the request from the ego vehicle 100, and transmits the acceptance to the ego vehicle 100 in step 525.

The ego vehicle 100 determines whether the request is approved or not in step 514. If the request is not approved by the connected vehicle 110, the ego vehicle 100 determines whether there is next cooperating vehicle in step 516. If there is no next cooperating vehicle, the ego vehicle 100 determines that changing lanes without causing string instability is infeasible in step 517. If there is a next cooperating vehicle, the ego vehicle selects a next vehicle in step 518, and transmits a request to the next vehicle in step 513. The next vehicle performs the similar process as the connected vehicle 110.

If the request is approved by the connected vehicle 110, the ego vehicle 100 initiates preforming mitigation and transmits a mitigation instruction to the connected vehicle 110. In response to receiving the mitigation instruction, the connected vehicle 110 changes lanes from the target lane 104 to the lane 106 in step 529. In parallel with the changing lanes by the connected vehicle 110, the ego vehicle 100 changes lane from the lane 102 to the target lane 104 in step 519.

Figure 6:
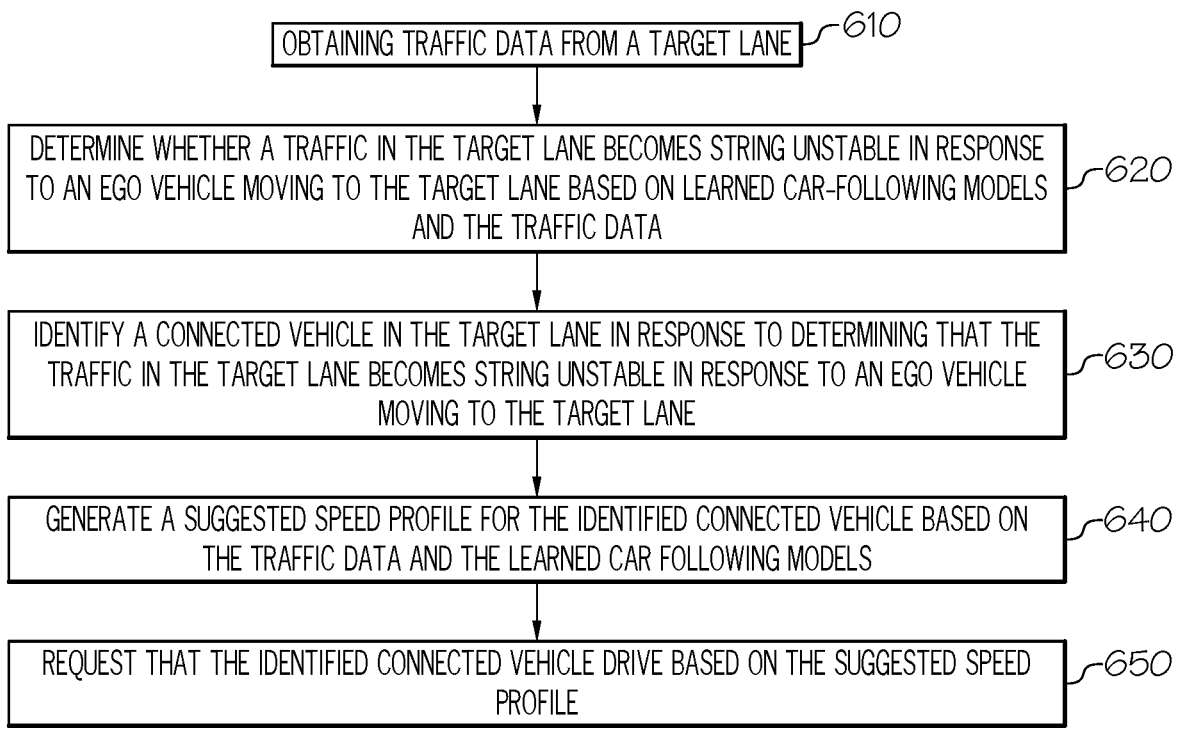
FIG. 6 depicts a flowchart for performing longitudinal control in a target lane including both human-driven and connected cooperating vehicles, according to one or more embodiments shown and described herein.

FIG. 6 depicts a flowchart for performing longitudinal control in a target lane including both human-driven and connected cooperating vehicles, according to one or more embodiments shown and described herein. The flowchart is described with reference to FIGS. 2 and 7A-7D of the present application.

In step 610, a controller of the ego vehicle obtains traffic data from a target lane. For example, by referring to FIG. 7A, the ego vehicle 100 may obtain traffic data from the target lane 104. The traffic information may include the presence and speed of connected or unconnected vehicles in the target lane 104, the traffic density of vehicles in the target lane 104, and the like. In this example, the ego vehicle 100 obtains information about the present and speed of the unconnected vehicles 121, 122, 123, 124, 125, 126 and the connected vehicle 110. The presence, speeds and/or accelerations of connected or unconnected vehicles in the target lane 104 may be obtained by the sensors of the ego vehicle 100. The traffic density may be estimated by a world model. The world model receives sensor data, wireless messages, and GPS data as input, and outputs traffic density estimation for the target lane 104. The ego vehicle 100 may also learn a car-following model of vehicles in the target lane 104.

Figure 7A:
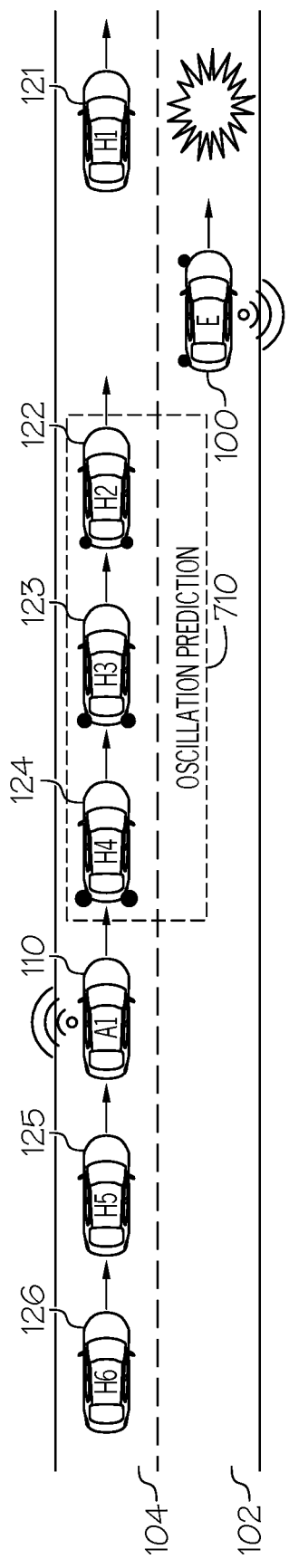
FIGS. 7A, 7B, 7C, and 7D depict a longitudinal control strategy example where an ego vehicle cooperates with a connected vehicle, according to one or more embodiments shown and described herein.
Figure 7B:
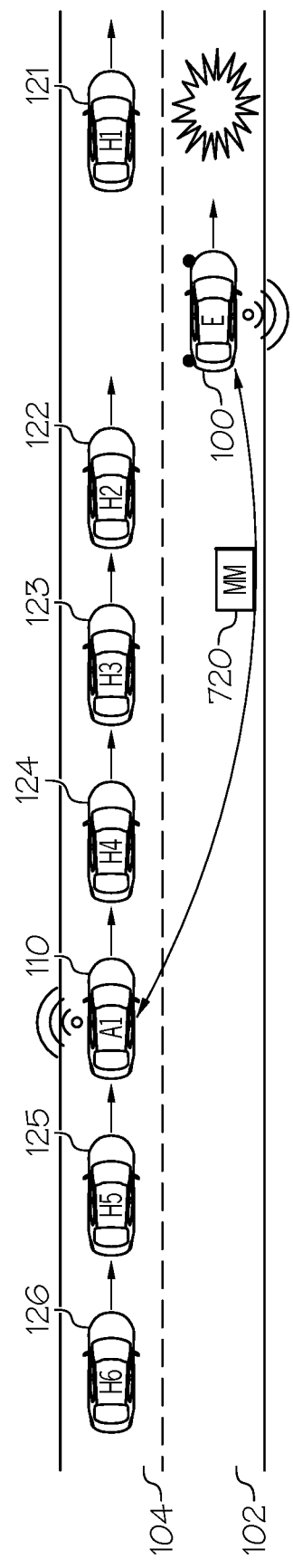

Referring back to FIG. 6, in step 620, the controller of the ego vehicle determines whether a traffic in the target lane becomes string unstable in response to an ego vehicle moving to the target lane based on learned car-following models and the traffic data. For example, the controller of the ego vehicle 100 may simulate the ego vehicle changing lanes from the lane 102 to the target lane 104 in FIG. 7A using the traffic data and the learned car following model obtained in step 610. The controller of the ego vehicle 100 may predict oscillations 710 of the unconnected vehicles 122, 123, 124 caused by the lane changing maneuver of the ego vehicle 100 as illustrated in FIG. 7A, and determines whether the traffic in the target lane 104 becomes string unstable based on the predicted oscillations. In some embodiments, the ego vehicle 100 may determine key performance indicators, e.g., traffic flow, oscillations in acceleration profiles, driver comfort, and timeliness of the maneuver, caused by the lane changing maneuver of the ego vehicle 100 by running simulations of the ego vehicle 100 and vehicles in the target lane 104. The simulation may use IDM (intelligent driving model) for upstream vehicles. Based on the key performance indicators, the controller of the ego vehicle 100 may determine whether the maneuver of the ego vehicle 100 triggers congestion or string instability in the target lane 104.

Referring back to FIG. 6, in step 630, the controller of the ego vehicle identifies a connected vehicle in the target lane in response to determining that the traffic in the target lane becomes string unstable in response to an ego vehicle moving to the target lane. For example, by referring to FIG. 7A, the ego vehicle 100 simulates its changing lanes from the lane 102 to the target lane 104 and the simulation results in string instability in the target lane 104, e.g., traffic congestion or stop-and-go traffic jam. Then, the ego vehicle 100 identifies the connected vehicle 110 in the target lane 104.

Referring back to FIG. 6, in step 640, the controller of the ego vehicle generates a suggested speed profile for the identified connected vehicle based on the traffic data and the learned car following models. In embodiments, the ego vehicle 100 generates a suggested profile for the connected vehicle 110 based on the traffic data collected in step 610 and the learned car following models, that mitigates disturbance or string instability in the target lane 104. For example, by referring to FIG. 7A, the ego vehicle 100 predicts speed or acceleration profile oscillations of the vehicles 122, 123, 124 in the target lane 104 based on car-following behaviors and collected traffic data such as the positions of the vehicles 122, 123, 124 in the target lane 104. Then, the ego vehicle 100 generates a speed profile for the connected vehicle 110 based on the predicted speed or acceleration profile oscillations of the vehicles 122, 123, 124. The speed profile for the connected vehicle 110, if followed by the connected vehicle 110, creates a gap between the connected vehicle and the unconnected vehicle 124 and mitigates speed or acceleration oscillations of the connected vehicle 110 and the vehicles behind the connected vehicle 110.

Figure 7C:
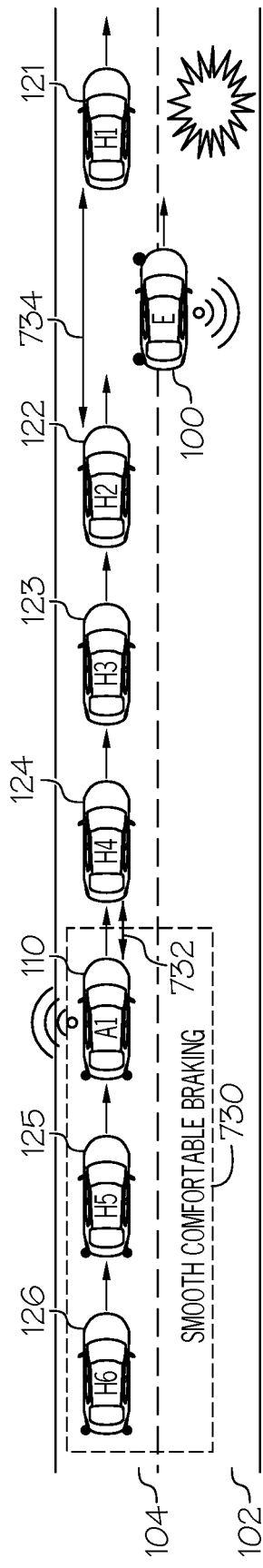

Referring back to FIG. 6, in step 650, the controller of the ego vehicle requests that the identified connected vehicle drive based on the suggested speed profile. In embodiments, by referring to FIG. 7B, the ego vehicle 100 transmits a maneuver message 720 to the connected vehicle 110. The maneuver message 720 includes the suggested speed profile for the connected vehicle 110. In response to receiving the maneuver message 720, the connected vehicle 110 brakes smoothly based on the suggested speed profile such that the space 732 between the vehicle 124 and the connected vehicle 110 becomes greater, as illustrated in FIG. 7C. Then, the ego vehicle 100 changes lanes from the lane 102 to the target lane 104 as illustrated in FIG. 7C. Specifically, the ego vehicle 100 moves into the space 734 between the vehicle 121 and the vehicle 122. In some embodiments, the ego vehicle 100 changes lanes from the lane 102 to the target lane 104 at the same time or before the connected vehicle 110 changes its speed.

Figure 7D:
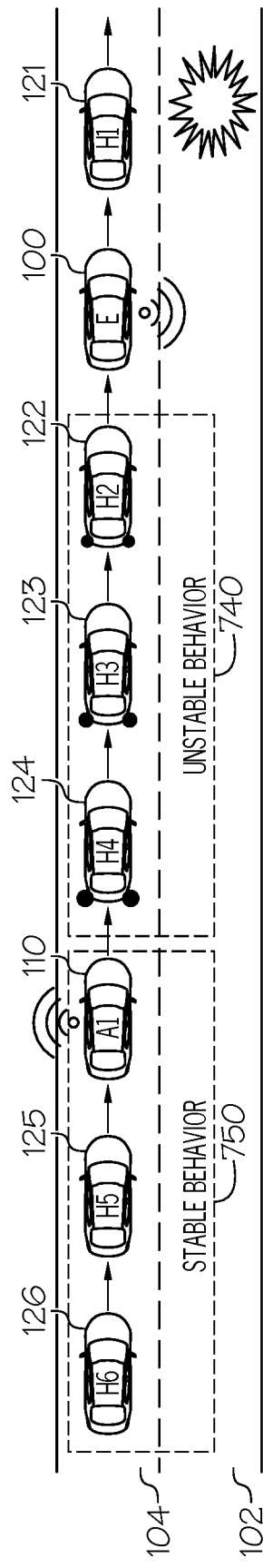

In response to the ego vehicle 100 moving into the target lane 104, a group of vehicles 122, 123, 124 may show unstable behavior 740 because the vehicles 122, 123, 124 show cascading of braking. However, because an additional space is now generated between the vehicle 124 and the connected vehicle 110, the connected vehicle 110 and the unconnected vehicles 125 and 126 may not need to brake significantly, and show stable behavior or string stability 750, as illustrated in FIG. 7D.

Figure 8:
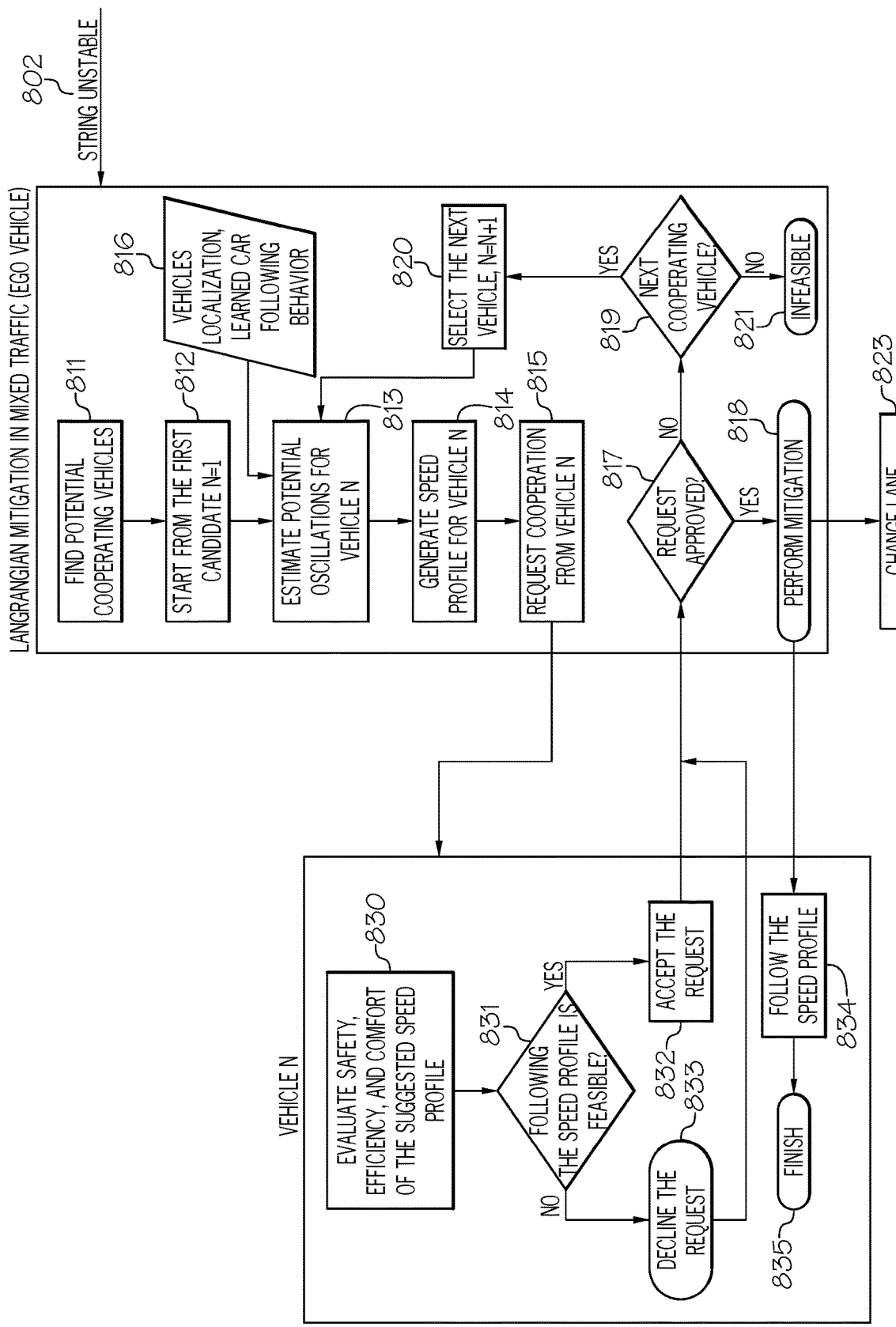
FIG. 8 depicts an overall flowchart of performing longitudinal control including both human-driven and connected cooperating vehicles, according to one or more embodiments shown and described herein.

FIG. 8 depicts an overall flowchart of performing longitudinal control including both human-driven and connected cooperating vehicles, according to one or more embodiments shown and described herein. The ego vehicle and vehicle n in FIG. 8 may correspond to the ego vehicle 100 and the connected vehicle 110 in FIGS. 7A-7D, respectively.

In step 802, the ego vehicle 100 determines that the traffic in the target lane 104 may be string unstable if the ego vehicle 100 changes lanes from the lane 102 to the target lane 104. In step 811, the ego vehicle 100 initiates finding a potential cooperating vehicle. In step 812, the ego vehicle 100 starts from a first candidate, e.g., the connected vehicle 110. The ego vehicle 100 estimates potential oscillations for the connected vehicle 110 based on the vehicles locations and learned car following behavior obtained in step 816. Based on the estimated potential oscillations, the ego vehicle generates a suggested speed profile for the connected vehicle 110 in step 814. Then, the ego vehicle 100 transmits a request for cooperation to the connected vehicle in step 815.

The connected vehicle 110 receives the request and evaluates safety, efficiency, and comfort of the suggested speed profile received from the ego vehicle 100 in step 830. In step 831, the connected vehicle 110 determines whether following the suggested speed profile is feasible. For example, the connected vehicle 110 may determine whether following the suggested speed profile is feasible based on current traffic data in the target lane 104 including the presence of other vehicles and car following models of the other vehicles in the target lane 104.

If it is determined that following the suggested speed profile is feasible, the connected vehicle 110 accepts the request from the ego vehicle 100 and transmits an approval message to the ego vehicle 100 in step 832. If it is determined that following the suggested speed profile is not feasible, the connected vehicle 110 declines the request from the ego vehicle 100 and transmits a decline message to the ego vehicle 100 in step 833.

The ego vehicle 100 determines whether the request is approved or not in step 817. If the request is not approved by the connected vehicle 110, the ego vehicle 100 determines whether there is next cooperating vehicle in step 819. If there is no next cooperating vehicle, the ego vehicle 100 determines that changing lanes without causing string instability is infeasible in step 821. If there is a next cooperating vehicle, the ego vehicle selects the next cooperating vehicle in step 820, and repeats the steps 813, 814, 815. The next cooperating vehicle performs the similar process as the connected vehicle 110.

If the request is approved by the connected vehicle 110, the ego vehicle 100 initiates preforming mitigation and transmits a mitigation instruction to the connected vehicle 110 in step 818. In response to receiving the mitigation instruction, the connected vehicle 110 follows the suggested speed profile in step 834. The ego vehicle 100 changes lane from the lane 102 to the target lane 104 in step 823.

FIGS. 9A-9D depict an example of performing longitudinal control in a fully connected scenario, according to one or more embodiments shown and described herein.

In FIG. 9A, traffic in the target lane 104 includes both connected vehicles 911, 912, 913, 914, 915, 916 (C1, . . . , C6) as well as connected cooperative vehicles 110 (A1). The ego vehicle 100 decides to change lanes from the lane 102 to the target lane 104. In this scenario, connected vehicles 912, 913, 914 are connected vehicles. However, the connected vehicles 912, 913, 914 cannot deploy actions to mitigate the potential disturbances in contrast with the connected cooperative vehicle 110. The connected vehicles 912, 913, 914 can send information regarding their real-time oscillations to the connected cooperative vehicle 110. The ego vehicle 100 predicts whether its lane change action will disturb traffic in the target lane 104.

In this scenario, in addition to the traffic information and the learned behavior models, the present system utilizes oscillation information from connected vehicles to better control the acceleration of connected vehicles 912, 913, 914 in the target lane to mitigate the disturbances. The present system collects oscillations data from connected vehicles and uses them to update the speed profile and improve the controller.

By referring to FIG. 9B, the ego vehicle 100 requests cooperation from the connected cooperating vehicle 110 and sends a maneuver message 920 including a suggested speed profile to the connected cooperating vehicle 110. Once the connected cooperating vehicle 110 accepts the request from the ego vehicle 100, the ego vehicle 100 sends maneuver messages 920 including requests for sharing oscillation data with the connected cooperative vehicle 110 to the connected vehicles 912, 913, 914.

Figure 9C:
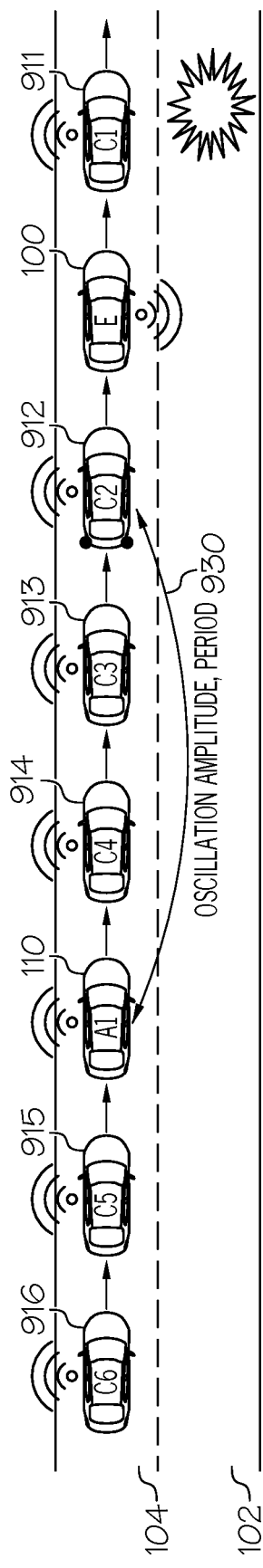

By referring to FIG. 9C, the connected vehicle 912 monitors the oscillation in its acceleration profile. Once oscillation detected, the connected vehicle 912 sends state data 930 such as oscillation amplitude, wavelength, and period to the connected cooperating vehicle 110. The connected cooperating vehicle 110 uses the data to update its speed profile and achieve optimum performance.

Figure 9D:
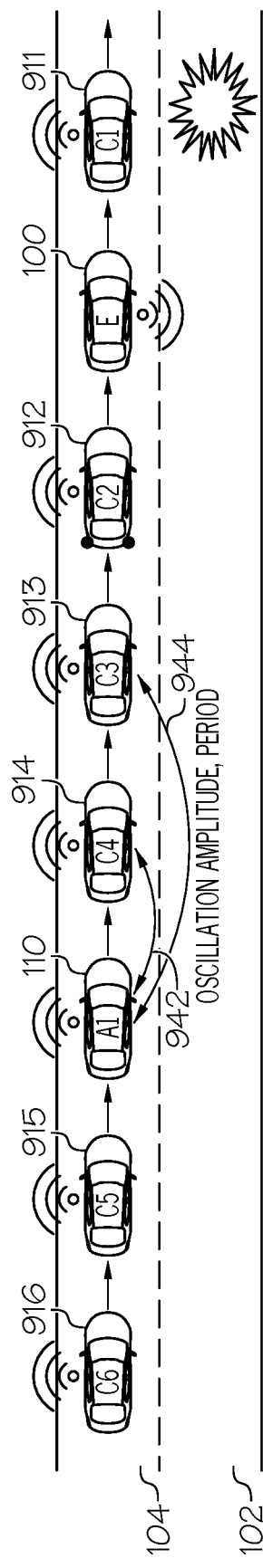

Similarly, the connected vehicles 913 and 914 may also share their state data 944 and 942 such as oscillation amplitude, wavelength, and period with the connected cooperating vehicle 110 as illustrated in FIG. 9D. The connected cooperating vehicle 110 updates its speed profile in real-time. The gap created by the connected cooperating vehicle 110 mitigates oscillations and leads to smooth behavior in the target lane 104.

FIGS. 10A-10D depict an example of performing longitudinal control in a partially connected scenario, according to one or more embodiments shown and described herein.

In this scenario, some of the vehicles in the target lane 104 are not connected vehicles. For example, by referring to FIG. 10A, vehicles 121, 122, 123, 124, 125 are not connected vehicles, the vehicle 911 is a connected vehicle, and the vehicle 110 is a connected cooperating vehicle 110.

By referring to FIG. 10B, the ego vehicle 100 requests cooperation from the connected cooperating vehicle 110 and sends a maneuver message 1020 including a suggested speed profile to the connected cooperating vehicle 110. Once the connected cooperating vehicle 110 accepts the request from the ego vehicle 100, the ego vehicle 100 sends a maneuver message 1020 including a request for sharing oscillation data with the connected cooperative vehicle 110 to the connected vehicle 911.

By referring to FIG. 10C, the connected vehicle 110 changes lanes from the lane 102 to the target lane 104. By referring to FIG. 10D, the connected vehicle 911 monitors the oscillation in its acceleration profile. Once oscillation detected, the connected vehicle 911 sends state data 1040 such as oscillation amplitude, wavelength, and period to the connected cooperating vehicle 110. The connected cooperating vehicle 110 uses the data to update its speed profile and achieve optimum performance.

Figure 10E:
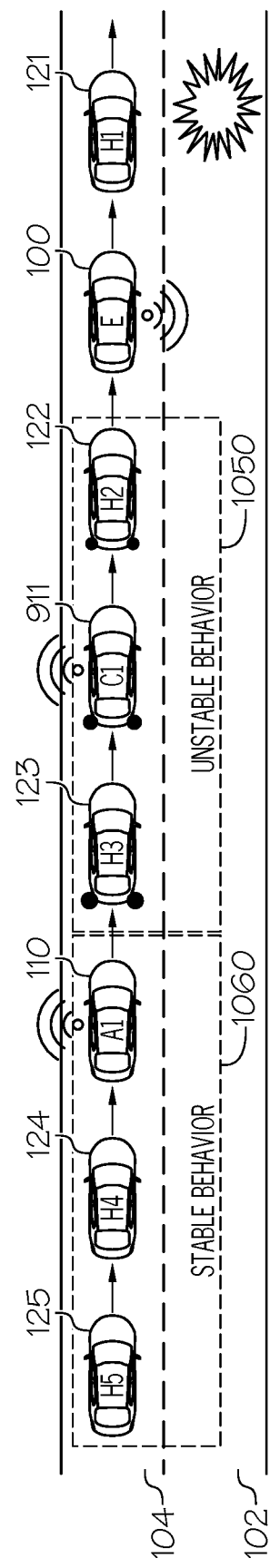

By referring to FIG. 10E, the vehicles 122 and 123 and the connected vehicle 911 show unstable behavior 1050 due to the lane changing maneuver of the ego vehicle 100. However, the connected vehicle 110 and the vehicles 124 and 125 show stable behavior 1060 because the gap created by the connected cooperating vehicle 110 mitigates oscillations and leads to smooth behavior in the target lane 104.

Figure 11A:
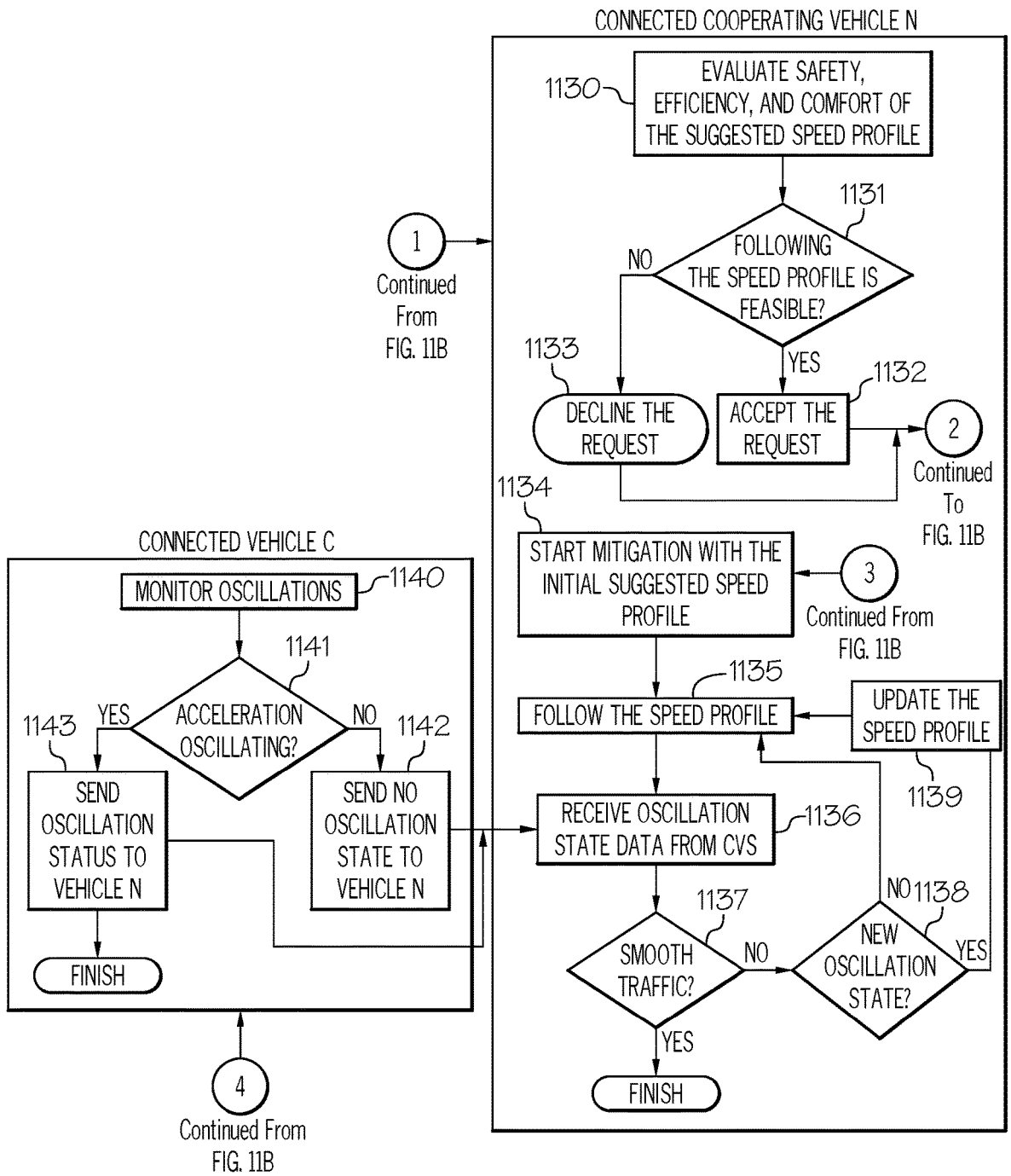
FIGS. 11A and 11B depict an overall flowchart of performing longitudinal control in a fully or partially connected scenario, according to one or more embodiments shown and described herein.
Figure 11B:
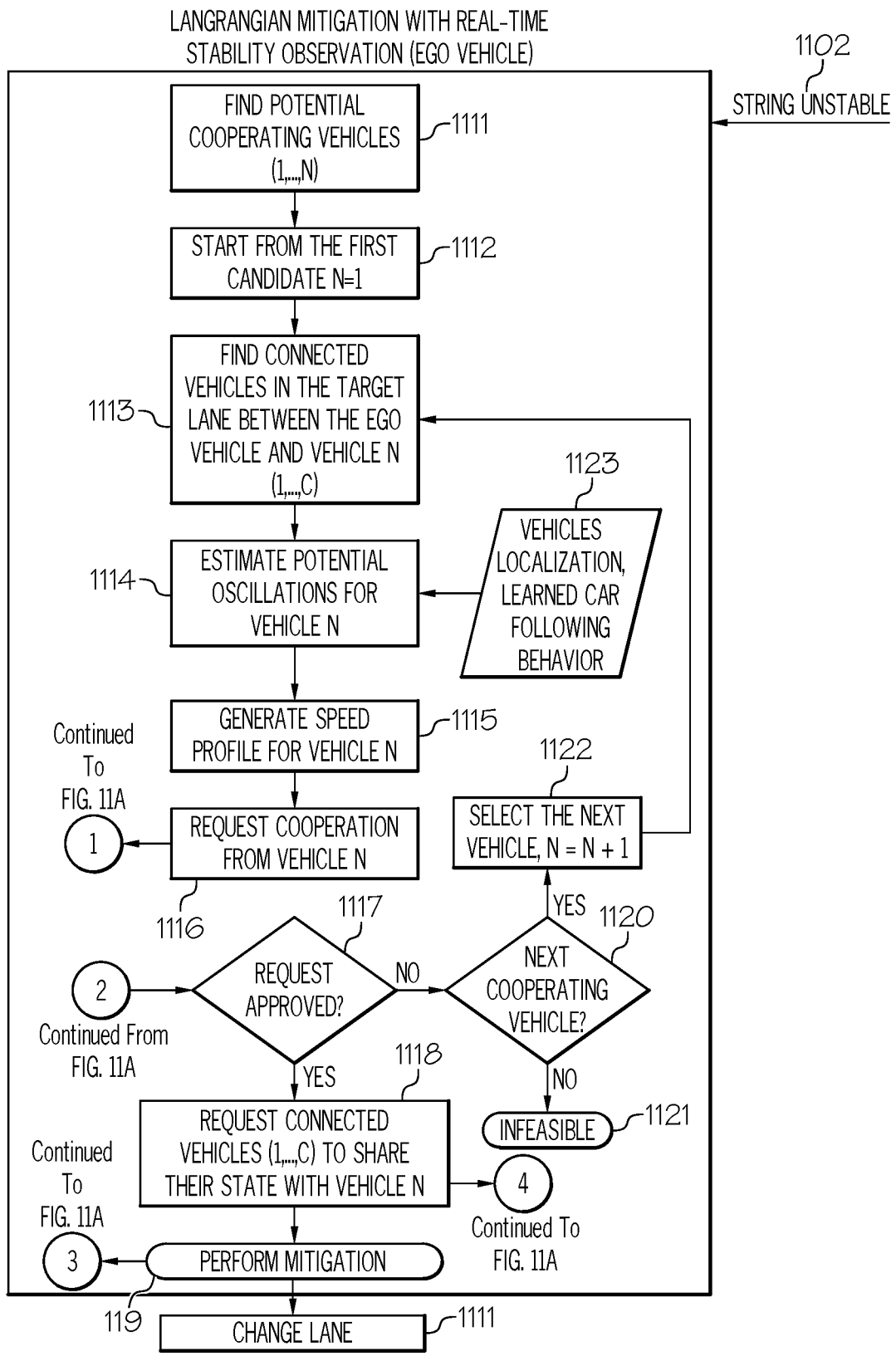

FIGS. 11A and 11B depict an overall flowchart of performing longitudinal control in a fully or partially connected scenario, according to one or more embodiments shown and described herein. The ego vehicle and vehicle n in FIGS. 11A and 11B may correspond to the ego vehicle 100 and the connected vehicle 110 in FIGS. 9A-10E, respectively, and the connected vehicle c in FIGS. 11A and 11B may correspond to one of the connected vehicles 912, 913, 914 in FIGS. 9A-9D or the connected vehicle 911 in FIGS. 10A-10E In step 1102, the ego vehicle 100 determines that the traffic in the target lane 104 may be string unstable if the ego vehicle 100 changes lanes from the lane 102 to the target lane 104. In step 1111, the ego vehicle 100 initiates finding a potential cooperating vehicle. In step 1112, the ego vehicle 100 starts from a first candidate, e.g., the connected vehicle 110. In step 1113, the ego vehicle 100 identifies connected vehicles in the target lane 104 between the ego vehicle 100 and the connected vehicle 110. For example, the ego vehicle 100 may identify connected vehicles 912, 913, 914 in FIG. 9A. In step 1114, the ego vehicle 100 estimates potential oscillations for the connected vehicle 110 based on the vehicles locations and learned car following behavior obtained in step 1126. Based on the estimated potential oscillations, the ego vehicle generates a suggested speed profile for the connected vehicle 110 in step 1115. Then, the ego vehicle 100 transmits a request for cooperation to the connected vehicle in step 1116.

The connected vehicle 110 receives the request and evaluates safety, efficiency, and comfort of the suggested speed profile received from the ego vehicle 100 in step 1130. In step 1131, the connected vehicle 110 determines whether following the suggested speed profile is feasible. For example, the connected vehicle 110 may determine whether following the suggested speed profile is feasible based on current traffic data in the target lane 104 including the presence of other vehicles and car following models of the other vehicles in the target lane 104.

If it is determined that following the suggested speed profile is feasible, the connected vehicle 110 accepts the request from the ego vehicle 100 and transmits an approval message to the ego vehicle 100 in step 1132. If it is determined that following the suggested speed profile is not feasible, the connected vehicle 110 declines the request from the ego vehicle 100 and transmits a decline message to the ego vehicle 100 in step 1133.

The ego vehicle 100 determines whether the request is approved or not in step 1117. If the request is not approved by the connected vehicle 110, the ego vehicle 100 determines whether there is a next cooperating vehicle in step 1120. If there is no next cooperating vehicle, the ego vehicle 100 determines that changing lanes without causing string instability is infeasible in step 1121. If there is a next cooperating vehicle, the ego vehicle selects a next vehicle in step 1122, and repeats the steps 1114, 1115, 1116. The next vehicle performs the similar process as the connected vehicle 110.

If the request is approved by the connected vehicle 110, the ego vehicle 100 requests connected vehicles, e.g., the connected vehicles 912, 913, 914 in 9B or the connected vehicle 911 in FIG. 10B to share their states such as oscillation amplitude, wavelength, and period with the connected vehicle 110. In response to receiving the requests from the ego vehicle 100, the connected vehicles 912, 913, 914 monitor their oscillations in step 1140, and determine whether the accelerations or speeds are oscillating in step 1141. If the accelerations or speeds are not oscillating, the connected vehicles 912, 913, 914 sends no oscillation state to the connected vehicle 110 in step 1143. If the accelerations or speeds are oscillating, the connected vehicles 912, 913, 914 sends oscillation state to the connected vehicle 110 in step 1142.

After or at the same time of transmitting a request to share state data to connected vehicles, e.g., the connected vehicles 912, 913, 914 in 9B or the connected vehicle 911 in FIG. 10B, the ego vehicle 100 initiates preforming mitigation and transmits a mitigation instruction to the connected vehicle 110 in step 1119. In response to receiving the mitigation instruction, the connected vehicle 110 starts mitigation with the initial suggested speed profile in step 1134 and follows the suggested speed profile in step 1135. In step 1136, the connected vehicle 110 receives oscillation state data from other connected vehicles such as the connected vehicles 912, 913, 914 in 9B or the connected vehicle 911 in FIG. 10B. Then, the connected vehicle 110 determines whether the traffic is smooth or not in step 1137. If the traffic is smooth, the connected vehicle 110 may not need to take further actions. If the traffic is not smooth, the connected vehicle 110 determines whether there is any new oscillation state in step 1138. If there is no new oscillation state, the connected vehicle 110 repeats the steps 1135, 1136, 1137. If there is a new oscillation state, the connected vehicle 110 updates the speed profile of the connected vehicle 110 based on the new oscillation state in step 1139, and repeats the steps 1135, 1136, 1137.

It should be understood that embodiments described herein are directed to a method for mitigating traffic congestion caused by a lane changing maneuver. In embodiments, the present disclosure utilize a density reduction approach where the system uses traffic information obtained by connected vehicles as well as the learned behavioral models to estimate potential disturbances and instructs connected cooperating vehicles to change lanes from a target lane to another lane. In some embodiments, the present disclosure utilizes longitudinal control of cooperating connected vehicles in the target lane to mitigate the disturbances. For the longitudinal control, the system considers a no real-time observation scenario where the system utilizes traffic information and learned behaviors to generate speed profile for the cooperating vehicle in the target lane. The system may also consider a full or partial real-time observation scenario where the systems utilizes real-time data obtained from connected vehicles to monitor characteristics of oscillations (e.g., amplitudes, wavelength, period) to better plan speed profiles of the cooperating vehicle. The present system improves performance of connected vehicles as well as the whole traffic system in terms of performance measures such as efficiency, comfort, and reliability.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for traffic density reduction, comprising:
obtaining traffic data from a target lane;
predicting speed or acceleration profile oscillations of vehicles in the target lane generated in response to an ego vehicle moving to the target lane;
determining whether a traffic in the target lane becomes string unstable in response to the ego vehicle moving to the target lane based on learned car-following models and the traffic data;
identifying a connected vehicle in the target lane in response to determining that the traffic in the target lane becomes string unstable in response to an ego vehicle moving to the target lane;

requesting that the identified connected vehicle change lanes from the target lane to another lane to obtain a first empty space between a vehicle in front of the identified connected vehicle and a vehicle behind the identified connected vehicle; and operating the ego vehicle to move to the target lane, wherein whether the traffic in the target lane becomes string unstable is determined based on the predicted speed or acceleration profile oscillations of vehicles.

2. The method of claim 1, wherein requesting that the identified connected vehicle change lanes comprises transmitting a vehicle-to-vehicle message to the identified connected vehicle.

3. The method of claim 1, wherein the traffic data from the target lane includes driving information about vehicles in the target lane.

4. The method of claim 1, further comprising:

receiving a decline from the identified connected vehicle in the target lane;

identifying another connected vehicle in the target lane; and requesting that the identified another connected vehicle change lanes from the target lane to another lane to obtain another empty space between a vehicle in front of the identified another connected vehicle and a vehicle behind the identified another connected vehicle.

5. The method of claim 1, further comprising:

receiving an approval from the identified connected vehicle in the target lane; and instructing the connected vehicle to change lanes from the target lane to another lane in response to receiving approval from the identified connected vehicle.

6. The method of claim 1, further comprising:

instructing the ego vehicle to enter into a second empty space by changing lanes from a current lane to the target lane, wherein the first empty space is further away from the ego vehicle than the second empty space.

7. A system for mitigating traffic congestion, the system comprising:

a network interface hardware; and a processor programmed to perform operations comprising:

obtaining traffic data from a target lane;

predicting speed or acceleration profile oscillations of vehicles in the target lane generated in response to an ego vehicle moving to the target lane;

determining whether a traffic in the target lane becomes string unstable in response to an ego vehicle moving to the target lane based on learned car-following models and the traffic data;

identifying a connected vehicle in the target lane in response to determining that the traffic in the target lane becomes string unstable in response to an ego vehicle moving to the target lane; requesting, through the network interface hardware, that the identified connected vehicle change lanes from the target lane to another lane to obtain an empty space between a vehicle in front of the identified connected vehicle and a vehicle behind the identified connected vehicle; and operating the ego vehicle to move to the target lane, wherein whether the traffic in the target lane becomes string unstable is determined based on the predicted speed or acceleration profile oscillations of vehicles.

8. The system for mitigating traffic congestion of claim 7, wherein the processor is further programmed to perform operations comprising:

receiving a decline from the identified connected vehicle in the target lane;

identifying another connected vehicle in the target lane; and requesting that the identified another connected vehicle change lanes from the target lane to another lane to obtain another empty space between a vehicle in front of the identified another connected vehicle and a vehicle behind the identified another connected vehicle.

9. The system for mitigating traffic congestion of claim 7, wherein the processor is further programmed to perform operations comprising:

receiving an approval from the identified connected vehicle in the target lane; and instructing the connected vehicle to change lanes from the target lane to another lane in response to receiving approval from the identified connected vehicle.

10. The system for mitigating traffic congestion of claim 7, wherein the processor is further programmed to perform operations comprising:

identifying another connected vehicle in the target lane in response to determining that the traffic in the target lane becomes string unstable in response to an ego vehicle moving to the target lane;

generating a suggested speed profile for the identified another connected vehicle based on the traffic data and the learned car-following models; and requesting that the identified another connected vehicle drive based on the suggested speed profile.

11. The system for mitigating traffic congestion of claim 10, wherein the processor is further programmed to perform operations comprising:

instructing other connected vehicles in the target lane to transmit state data to the identified another connected vehicle.

12. The system for mitigating traffic congestion of claim 10, wherein the identified another connected vehicle follows the suggested speed profile to create a first empty space between the identified another connected vehicle and a vehicle in front of the identified another connected vehicle in the target lane, and wherein the processor is further programmed to perform operations comprising:

instructing the ego vehicle to enter into a second empty space in the target lane by changing lanes from a current lane to the target lane.

* * * * *

UNITED STATES PATENT AND TRADEMARK OFFICE
CERTIFICATE OF CORRECTION

PATENT NO. : 12,293,657 B2  
APPLICATION NO. : 17/830776  
DATED : May 6, 2025  
INVENTOR(S) : Yashar Zeiynali Farid et al.

Page 1 of 1

It is certified that error appears in the above-identified patent and that said Letters Patent is hereby corrected as shown below:

In the Specification

In Column 10, Line(s) 27, after "starts from", delete "a" and insert --the--, therefor.

In Column 10, Line(s) 32, delete "FIG. 6A" and insert --FIG. 4A--, therefor.

In Column 10, Line(s) 35, delete "523" and insert --110--, therefor.

In Column 10, Line(s) 43, after "target lane", insert --in step 526--, therefor.

In Column 10, Line(s) 64, after "performs", delete "the" and insert --a--, therefor.

In Column 10, Line(s) 67, delete "initiates preforming" and insert --performing--, therefor.

In Column 12, Line(s) 60, after "starts from", delete "a" and insert --the--, therefor.

In Column 13, Line(s) 29, after "performs", delete "the" and insert --a--, therefor.

In Column 13, Line(s) 32, delete "initiates preforming" and insert --performing--, therefor.

In Column 14, Line(s) 67, after "starts from", delete "a" and insert --the--, therefor.

In Column 15, Line(s) 8, delete "1126" and insert --1123--, therefor.

In Column 15, Line(s) 38, after "vehicle selects", delete "a" and insert --the--, therefor.

In Column 15, Line(s) 39, before "1114", insert --1113,--.

In Column 15, Line(s) 60, delete "initiates preforming" and insert --performing--, therefor.

Signed and Sealed this  
Twenty-ninth Day of July, 2025

Coke Morgan Stewart  
*Acting Director of the United States Patent and Trademark Office*